3,215,697
NOVEL 4-OXO-1,2,3,4-TETRAHYDRO-
QUINAZOLINES
Karl Heinz Hauptmann and Karl Zeile, Ingelheim, Germany, assignors to Boehringer Ingelheim Gesellschaft mit beschränkter Haftung, Ingelheim (Rhine), Germany, a corporation of Germany
No Drawing. Filed June 17, 1963, Ser. No. 288,445
Claims priority, application Germany, June 19, 1962, B 67,728
5 Claims. (Cl. 260—256.4)

This invention relates to novel 4-oxo-1,2,3,4-tetrahydro-quinazolines, as well as to acid addition salts and quaternary ammonium salts thereof.

More particularly, the present invention concerns novel 4-oxo-1,2,3,4-tetrahydro-quinazolines of the formula

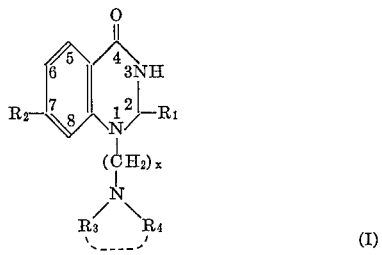

wherein
$R_1$ is aryl or aralkyl, where the aryl radical or the aromatic moiety of the aralkyl radical may carry a halogen, methyl or methoxy substituent in the p-position, a heterocyclic ring,
$R_2$ is hydrogen or halogen,
$R_3$ and $R_4$ are lower alkyl, preferably of 1 to 3 carbon atoms, or together with each other and the adjacent nitrogen, a basic heterocycle, and
$x$ is a whole number from 2 to 3, inclusive, their non-toxic, pharmacologically acceptable acid addition salts and their non-toxic quaternary ammonium salts.

The novel 4-oxo-1,2,3,4-tetrahydro-quinazolines of the present invention may be prepared by various methods which are known in principle, among which the following have proved to be most convenient and efficient:

METHOD A

Condensation of an N-(amino-lower alkyl)-anthranilic acid amide of the formula

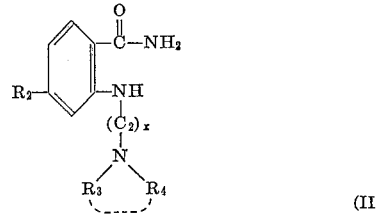

wherein $R_2$, $R_3$, $R_4$ and $x$ have the same meanings as in Formula I, with an araliphatic, aromatic or heterocyclic aldehyde of the formula $$R_1CHO \qquad (III)$$

wherein $R_1$ has the same meanings as in Formula I.

The condensation reaction is advantageously effected by heating a solution of the reactants in an inert organic solvent, such as ethanol, benzene, toluene, xylene or a mixture of any two or more of these, in the presence of a basic catalyst, such as piperidine or trimethylamine.

In general, the required reaction time is about 1 to 8 hours, and the reaction temperature is between 80° C. and reflux temperature. It is particularly advantageous to remove the water formed by condensation reaction azeotropically, for instance by heating the reactants in xylene, which leads to a considerable increase in the yield of the desired reaction product.

Examples of suitable aldehydes of the Formula III are the following: benzaldehyde, p-chloro-benzaldehyde, p-bromo-benzaldehyde, p-fluoro-benzaldehyde, p-toluylaldehyde, anisaldehyde, phenylacetaldehyde, p-toluylacetaldehyde, picolinaldehyde, nicotinaldehyde, isonicotinaldehyde, 5-methyl-picolinaldehyde, 6-chloro-nicotinaldehyde, 5-bromo-picolinaldehyde, 5-methoxy-picolinaldehyde, 2-thiophenaldehyde, 4-bromo-thiophenaldehyde, 2-piperidinaldehyde, 3-piperidinaldehyde, 5-methyl-piperidinaldehyde - (2), 5 - bromo - piperidinaldehyde - (2), 5 - fluoro-piperidinaldehyde - (2), 6 - methyl-piperidinaldehyde-(3) and 6-chloro-piperidinaldehyde-(3).

METHOD B

Reaction of an N-(amino-lower alkyl)-anthranilic acid amide of the Formula II with an araliphatic, aromatic or heterocyclic acid halide of the formula $$R_1COHal \qquad (IV)$$

wherein $R_1$ has the same meanings as in Formula I and Hal is halogen, to form an N-aminoalkyl-N-acyl-anthranilic acid amide of the formula

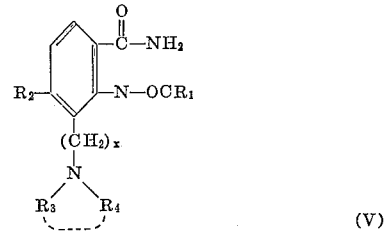

wherein $R_1$, $R_2$, $R_3$, $R_4$ and $x$ have the same meanings as previously defined, dehydration of compound V to effect ring closure to form the corresponding 4-oxo-quinazoline of the formula

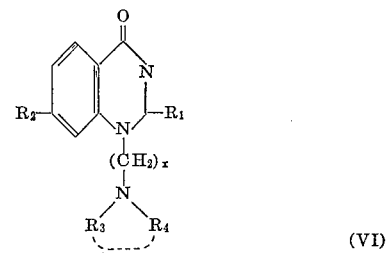

wherein $R_1$, $R_2$, $R_3$, $R_4$ and $x$ also have the meanings previously defined, and hydogenation of compound VI to form the desired 4-oxo-1,2,3,4-tetrahydro-quinazoline of the Formula I.

The reaction between the acide halide IV and the anthranilic acid amide II is performed in an inert organic solvent, such as ethanol, benzene, toluene, xylene and the like, advantageously in the presence of a basic catalyst, preferably pyridine. The reactants are merely allowed to react with each other for a few hours at room temperature or slightly elevated temperatures. After removal of the inert organic solvent, the N-aminoalkyl-N-acyl-anthranilic acid amide V is obtained as a residue, which is then heated to about 130–150° C. to effect dehydration and ring closure.

The catalytic hydrogenation of the 4-oxo-quinazoline VI is effected by customary methods, using noble metals or sodium borohydride or lithium aluminum hydride as hydrogenation catalysts. After completion of the hydrogenation the catalyst is removed, the residue is taken up in water, and the free base is liberated by the addition of ammonia to the solution. By subsequent extraction with an organic solvent the substituted 4-oxo-1,2,3,4-tetrahydro-quinazoline is recovered with practically quantitative yields.

Typical examples of acid halides of the Formula IV are the following: Benzoyl chloride, p-chlorobenzoyl chloride, p-toluyl chloride, p-methoxybenzoyl bromide, phenylacetyl chloride, p-bromophenylacetyl bromide, p-toluylacetyl chloride, picolinic acid chloride, 5-methoxy-picolinic acid chloride, 5-chloro-picoline aicd chloride, nicotinic acid chloride, 6-fluoro-nicotinic acid chloride, 6-methyl-nicotinic acid chloride and isonicotinic acid chloride.

If desired, the substituted 4-oxo-1,2,3,4-tetrahydro-quinazolines of the Formula I may be transformed into their acid addition salts or quaternary ammonium salts by customary methods. For instance, the acid addition salts may be obtained by dissolving the free base in a suitable solvent and acidifying the solution with the desired acid. To prepare a quaternary ammonium salt, the free base is merely reacted with a suitable quaternizing agent, such as an alkylhalide, an aralkylhalide or dialkylsulfate, preferably in the presence of an inert organic solvent.

The N-aminoalkyl-anthranilic acid amides of the Formula II, which are used as starting materials in both Methods A and B, have not previously been described in the literature. They may be prepared in the following manner: An alkali metal salt of o-chloro-benzoic acid is boiled with an aminoalkylamide in aqueous or alcoholic solution, preferably in amylalcohol solution, in the presence of copper powder for 48 hours, whereby the alkali metal salt of the corresponding o-aminoalkylamino-benzoic acid is obtained with a yield of about 80–90%. After first acid and then alkaline extraction of the aqueous solution of this alkali metal salt it is reacted with phosgene in weakly acid solution, whereby the very unstable corresponding isatic acid anhydride is formed, which is then treated with ammonia at temperatures from 20 to 40° C. to yield the desired N-aminoalkyl-anthranilic acid amide of the Formula II.

The following examples further illustrate the present invention and will enable others to understand the invention more completely. It should be understood, however, that the instant invention is not limited to these particular examples.

*Example I*

PREPARATION OF 1-DIMETHYLAMINOETHYL-2-PHENYL-7-CHLORO-4-OXO-1,2,3,4-TETRAHYDRO - QUINAZOLINE BY METHOD A

A mixture of 10 g. of 2-dimethylaminoethyl-4-chloro-anthranilic acid amide, 30 g. of benzaldehyde and 12 drops of piperidine was heated for four hours at 110° C. and then for three hours at 120° C. The reaction mixture was thereafter stirred into 200 cc. of 2 N hydrochloric acid, and the resulting acid solution was extracted with ether, filtered through charcoal and neutralized with ammonia. The precipitate formed thereby was separated by vacuum filtration. 14.2 gm. of raw 1-dimethylamino-ethyl-2-phenyl-7-chloro-4-oxo-1,2,3,4 - tetrahydro-quinazoline of the formula

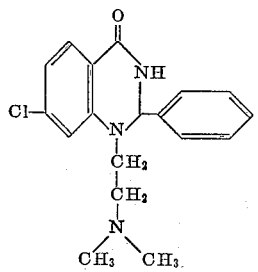

were obtained. The raw product, which had a melting point of 150–153° C. was taken up in chloroform, the resulting solution was dried with magnesium sulfate, filtered through charcoal, the chloroform was evaporated in vacuo, and the residue was recrystallized from isopropylether. Yield: 11.7 gm. (90% of theory) of the analytically pure product; M.P. 155–156° C.

*Example II*

PREPARATION OF 1-DIMETHYLAMINOETHYL-2-p-CHLOROPHENYL-7-CHLORO - 4 - OXO-1,2,3,4-TETRAHYDRO-QUINAZOLINE BY METHOD A 10 gm. of 2-dimethylaminoethyl-4-chloro-anthranilic acid amide were dissolved in 250 cc. of xylene. 7 gm. of p-chlorobenzaldehyde and 0.5 cc. of piperidine were added to the xylene solution. The reaction mixture was then heated for some time at 100° C. and thereafter refluxed for two hours in a reflux apparatus provided with a water separator. In the course of two hours, about 1.6 cc. of water collected in the water separator. The reaction solution was then evaporated to dryness in vacuo, and the residue was digested in 2 N hydrochloric acid. The precipitate formed thereby, which was identified to be 1-dimethylaminoethyl-2-p-chlorophenyl-7-chloro - 4-oxo-1,2,3,4-tetrahydro-quinazoline hydrochloride, was separated by vacuum filtration and suspended in water; the aqueous suspension was made alkaline with ammonia. The free base liberated thereby was taken up in chloroform and the resulting solution was dried with magnesium sulfate, filtered through charcoal and evaporated in vacuo. The residue was recrystallized from isopropylether, yielding 13.2 gm. (88% of theory) of analytically pure 1-dimethylaminoethyl-2-p-chlorophenyl-7-chloro - 4-oxo-1,2,3,4-tetrahydroquinazoline of the formula

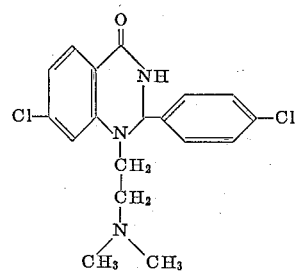

having a melting point of 153–154° C.

*Example III*

Using a procedure analogous to that described in Example II, 1-dimethylaminoethyl-2-p-chlorophenyl-4-oxo-1,2,3,4-tetrahydro-quinazoline of the formula

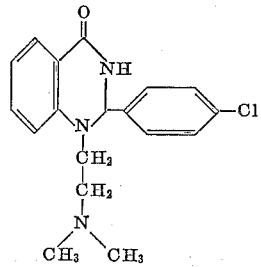

was obtained by condensation of 2-dimethylaminoethyl-anthranilic acid amide with p-chlorobenzaldehyde. The product had a melting point of 133–134° C.

*Example IV*

PREPARATION OF 1-DIMETHYLAMINOETHYL-2-p-CHLOROPHENYL - 4 - OXO-1,2,3,4-TETRAHYDRO-QUINAZOLINE BY METHOD B (a) *Preparation of N-dimethylaminoethyl-N-p-chlorobenzoyl-anthranilic acid amide.*—20 gm. of 2-dimethyl-aminoethyl-anthranilic acid amide were dissolved in a mixture of 250 cc. of benzene and 8.7 gm. of pyridine. A solution of 18.6 gm. of p-chloro-benzoic acid chloride in 30 cc. of benzene was added, and the reesulting reaction mixture was heated for eight hours at 50° C. Thereafter, the reaction mixture was allowed to cool, the precipitated pyridine hydrochloride was separated by vacuum filtrataion, and the filtrate was carefully evaporated to dryness in vacuo. The residue was digested with 2 N sodium hydroxide in the cold, and the alkaline solution was extracted with chloroform. The chloroform extract solution was dried with magnesium sulfate, filtered through charcoal, and the chloroform was distilled off in vacuo. The residue was recrystallized from isopropylether, yielding 27.8 gm. (83% of theory) of N-dimethylaminoethyl-N-p-chlorobenzoyl-anthranilic acid amide of the formula

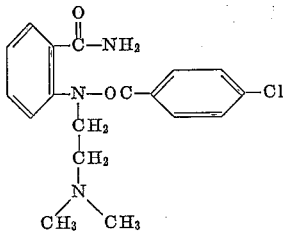

having a melting point of 145° C.

(b) *Preparation of 1-dimethylaminoethyl-2-p-chlorophenyl-4-oxo-quinazoline.*—12 gm. of N-dimethylaminoethyl-N-p-chlorobenzoyl-anthranilic acid amide were heated for 15 minutes to 140–150° C. Accompanied by vigorous frothing, water was split off and a clear melt was formed. After being allowed to cool, the substance was dissolved in isopropanol. A small amount of ether was added to the solution, whereby a crystalline precipitate formed. The precipitate was separated, yielding 10.5 gm. (91% of theory) of 1-dimethylaminoethyl - 2 - p-chlorophenyl-4-oxo-quinazoline of the formula

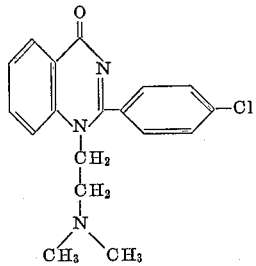

having a melting point of 136° C.

(c) *Preparation of 1-dimethylaminoethyl-2-p-chlorophenyl-4-oxo-1,2,3,4-tetrahydro-quinazoline.*—2 gm. of 1-dimethylaminoethyl - 2 - p - chlorophenyl-4-oxo-quinazoline were dissolved in 30 cc. of isopropanol, and 19.0 gm. of sodium borohydride were added to the solution. The reaction mixture was then stirred for three to four hours at 20–30° C. The excess sodium borohydride was decomposed with ethanol, the reaction solution was evaporated in vacuo, the residue was dissolved in water, and the aqueous solution was made alkaline with ammonia. The alkaline solution was then extracted with benzene, the benzene extract solution was dried with magnesium sulfate, filtered through charcoal, and the benzene solvent was distilled off in vacuo. The distillation residue was recrystallized from isopropyl ether. A quantitative yield of 1-dimethyl-aminoethyl-2-p-chlorophenyl-4-oxo-1,2,3,4-tetrahydro-quinazoline of the formula

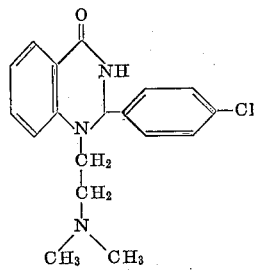

was obtained. The product had a melting point of 133–134° C.

*Example V*

PREPARATION OF 1-DIMETHYLAMINOETHYL-2-α-PYRIDYL - 4 - OXO-1,2,3,4-TETRAHYDRO-QUINAZOLINE BY METHOD A 20.7 gm. of 2 - dimethylaminoethyl-anthranilic acid amide (M.P. 122–124° C.) were dissolved in 300 cc. of xylene in a three-neck flask provided with a reflux condenser including a water separator. 10.7 gm. of freshly distilled pyridine-aldehyde and 0.5 cc. of piperidine were added to the xylene solution. Thereafter, while vigorously stirring, the reaction mixture was heated first for 30 minutes at 100° C. and was then refluxed for two hours. During reflux, 1.8 cc. of water separated out in the water separator. After completion of the reaction, the reaction mixture was evaporated in vacuo, the residue was taken up in benzene, and the resulting solution was washed several times with a small amount of water. The benzene solution was then dried with magnesium sulfate, filtered through charcoal and evaporated in vacuo. The residue was recrystallized from benzene, yielding 26.8 gm. (90% of theory) of 1-dimethylaminoethyl-2-x-pyridyl-4-oxo-1,2,3,4-tetrahydro-quinazoline of the formula

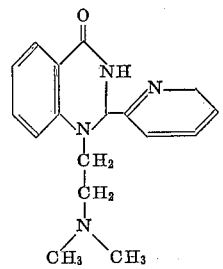

having a melting point of 120–121° C.

*Example VI*

Using a procedure analogous to that described in Example I, 1 - dimethylaminoethyl-2-phenyl-4-oxo-1,2,3,4-tetrahydro-quinazoline of the formula

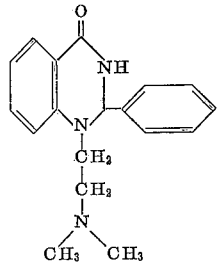

was prepared from 2-dimethylaminoethyl-anthranilic acid amide and benzaldehyde. Its hydrochloride had a melting point of 157- C.

*Example VII*

Using a procedure analogous to that described in Example I, 1-dimethylaminoethyl -2 - benzyl - 4-oxo-1,2,3,4-tetrahydroquinazoline of the formula

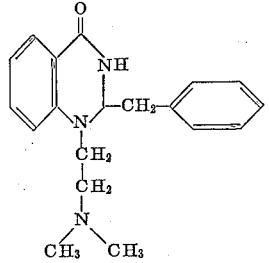

was prepared from 2-dimethylaminoethyl-anthranilic acid amide and phenylacetaldehyde. The product had a melting point of 131–132° C.

Example VIII

Using a procedure analogous to that described in Example I, 1-diethylaminoethyl-2-phenyl-4-oxo-1,2,3,4-tetrahydro-quinazoline of the formula

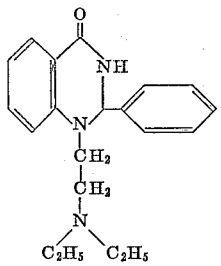

was prepared from 2-diethylaminoethyl-anthranilic acid amide and benzaldehyde. Its oxalate had a melting point of 147–149° C.

Example IX

Using a procedure analogous to that described in Example III, 1-diethylaminoethyl-2-p-chlorophenyl-4-oxo-1,2,3,4-tetrahydro-quinazoline of the formula

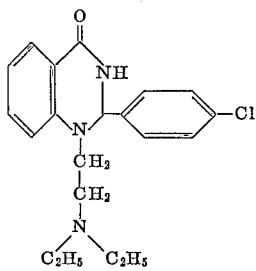

was prepared from 2-diethylaminoethyl-anthranilic acid amide and p-chlorobenzaldehyde. Its oxalate had a melting point of 137–139° C.

Example X

Using a procedure analogous to that described in Example I, 1-(γ-dimethylamino-n-propyl) - 2-phenyl-4-oxo-1,2,3,4-tetrahydro-quinazoline of the formula

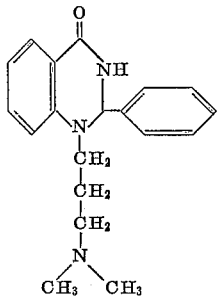

was prepared from 2-(γ-dimethylamino-n-propyl)-anthranilic acid amide and benzaldehyde. The product had a melting point of 186–189° C.

Example XI

Using a procedure analogous to that described in Example II, 1-(γ-dimethylamino-n-propyl)-2-phenyl-7-chloro-4-oxo-1,2,3,4-tetrahydro-quinazoline of the formula

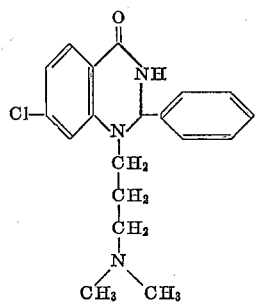

was prepared from 2-(γ-dimethylamino-n-propyl)-4-chloro-anthranilic acid amide and benzaldehyde. The product had a melting point of 198° C.

Example XII

Using a procedure analogous to that described in Example I, 1-dimethylaminoethyl - 2-p-methylphenyl-4-oxo-1,2,3,4-tetrahydro-quinazoline of the formula

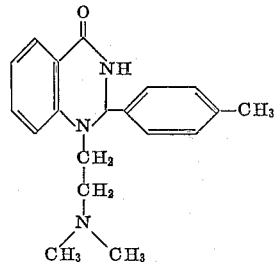

was prepared from 2-dimethylaminoethyl-anthranilic acid amide and p-tolualdehyde. The product had a melting point of 136–137° C.

Example XIII

Using a procedure analogous to that described in Example I, 1-dimethylaminoethyl-2-p-methoxyphenyl-4-oxo-1,2,3,4-tetrahydro-quinazoline of the formula

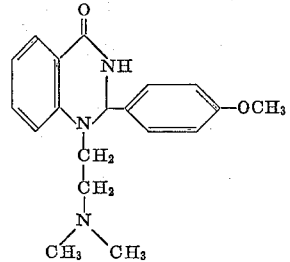

was prepared from 2-dimethylaminoethyl-anthranilic acid amide and anisaldehyde. The product had a melting point of 103–104° C.

Example XIV

Using a procedure analogous to that described in Example V, 1-dimethylaminoethyl - 2 - α-pyridyl-7-chloro-4-oxo-1,2,3,4-tetrahydro-quinazoline of the formula

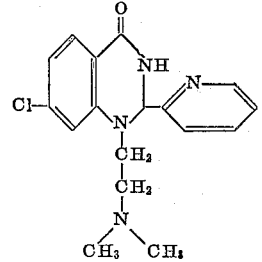

was prepared from 2-dimethylaminoethyl-4-chloro-anthranilic acid amide and o-picolinaldehyde. Its oxalate had a melting point of 166° C.

Example XV

Using a procedure analogous to that described in Example V, 1-diethylaminoethyl - 2-α-pyridyl-4-oxo-1,2,3,4-tetrahydro-quinazoline of the formula

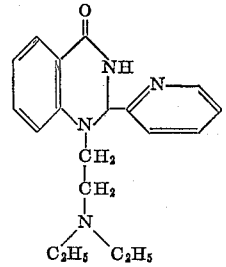

was prepared from 2-diethylaminoethyl-anthranilic acid amide and o-picolinaldehyde. Its oxalate had a melting point of 151° C.

*Example XVI*

Using a procedure analogous to that described in Example V, 1-dimethylaminoethyl-2-γ-pyridyl-4-oxo-1,2,3,4-tetrahydro-quinazoline of the formula

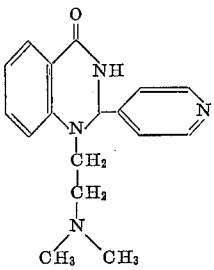

was prepared from 2-dimethylaminoethyl-anthranilic acid amide and p-picolinaldehyde. The product had a melting point of 168 C.

*Example XVII*

Using a procedure analogous to that described in Example V, 1-dimethylaminoethyl-2-β-pyridyl-4-oxo-1,2,3,4-tetrahydro-quinazoline of the formula

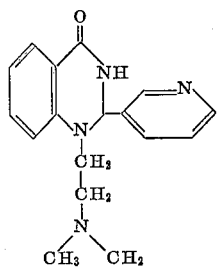

was prepared from 2-dimethylaminoethyl-anthranilic acid amide and p-picolinaldehpde. The product had a melting point of 148–149° C.

The compounds of the present invention, that is, the 4-oxo-1,2,3,4-tetrahydro-quinazoline substitution products embraced by Formula I, their non-toxic acid addition salts and their non-toxic quaternary ammonium salts, have useful pharmacodynamic properties. More particularly, the compounds according to the present invention exhibit very effective antihistamine activities, coupled with low toxicity and freedom from undesirable sedative side effects.

Typical examples of non-toxic, pharmacologically acceptable acid addition salts include, but are not limited to, the acid addition salts formed with hydrochloric acid, hydrobromic acid, hydroiodic acid, sulfuric acid, phosphoric acid, nitric acid, acetic acid, propionic acid, butyric acid, valeric acid, oxalic acid, malonic acid, succinic acid, maleic acid, furamric acid, lactic acid, tartaric acid, citric acid, malic acid, benzoic acid, phthalic acid, cinnamic acid, salicylic acid, nicotinic acid, 2-furoic acid, 8-chloro-theophylline or the like.

Examples of non-toxic quaternary ammonium salts are those found with alkyl halides, aralkyl halides or dialkyl-sulfates.

For pharmacological purposes, the compounds of the present invention may be administered perorally or parenterally as active ingredients in customary dosage unit compositions, that is, compositions consisting essentially of an inert, physiologically compatible carrier having distributed therein one dosage unit of the active ingredient. One dosage unit of the compounds of the present invention is 10 to 80 mgm., preferably 20 to 40 mgm. Typical examples of such dosage unit compositions are tablets, coated pills, hypodermic solutions, rectal suppositories, suspensions or solutions adapted for administration per os, gelatin capsules, wafer capsules, ointments, powders, nose drops, eye drops, aerosol sprays and the like.

The following examples illustrate various dosage unit compositions comprising compounds of the present invention as active ingredients. The parts are parts by weight unless otherwise specified. The ingredients of the individual compositions are compound in customary fashion.

*Example XVIII*

*Hypodermic solution.*—The solution is compounded from the following ingredients:

| | |
|---|---:|
| 1-dimethylaminoethyl-2-(α-pyridyl)-4-oxo-1,2,3,4-tetrahydro-quinazoline hydrochloride __ parts__ | 15.0 |
| Tartaric acid _____ do____ | 5.0 |
| Sodium chloride _____ do____ | 6.0 |
| Double-distilled water, q.s. ad ___ parts by vol__ | 1000.0 |

*Example XIX*

*Ointment.*—The ointment is compounded from the following ingredients:

| | Parts |
|---|---:|
| 1-dimethylaminoethyl-2 - (α-pyridyl)-4-oxo-1,2,3,4-tetrahydro-quinazoline hydrochloride _____ | 1.5 |
| Vaseline, q.s. ad _____ | 100.0 |

*Example XX*

*Powder.*—The powder is compounded from the following ingredients:

| | Parts |
|---|---:|
| 1-dimethylaminoethyl-2 - (α-pyridyl)-4-oxo-1,2,3,4-tetrahydro-quinazoline hydrochloride _____ | 1.5 |
| Talcum, q.s. ad _____ | 100.0 |

*Example XXI*

*Nose drops.*—The drop solution is compounded from the following ingredients:

| | |
|---|---:|
| 1-dimethylaminoethyl-2-(α-pyridyl)-4-oxo-1,2,3, 4-tetrahydro-quinazoline hydrochloride parts__ | 0.075 |
| Hydroxyethyl cellulose _____ do____ | 0.700 |
| Citric acid _____ do____ | 0.250 |
| Secondary sodium phosphate 12H₂O ___ do____ | 3.560 |
| Phenylmercury borate _____ do____ | 0.001 |
| Demineralized water, q.s. ad ____ parts by vol__ | 100.000 |

*Example XXII*

*Spray.*—The spray solution is compounded from the following ingredients:

| | |
|---|---:|
| 1-dimethylaminoethyl-2-(α-pyridyl)-4-oxo-1,2,3, 4-tetrahydro-quinazoline hyrochloride parts__ | 0.075 |
| Citric acid _____ do____ | 0.250 |
| Secondary sodium phosphate 12H₂O ___ do____ | 3.560 |
| Phenylmercury borate _____ do____ | 0.001 |
| Demineralized water, q.s. ad ____parts by vol__ | 100.000 |

*Example XXIII*

*Eye drops.*—The drop solution is compounded from the following ingredients:

| | |
|---|---:|
| 1-dimethylaminoethyl - 2 - (α-pyridyl) - 4 - oxo-1,2,3,4 - tetrahydro - quinazoline hydrochloride _____parts__ | 0.100 |
| Citric acid _____do____ | 0.250 |
| Secondary sodium phosphate 12H₂O ____do____ | 3.560 |
| Phenylmercury borate _____do____ | 0.001 |
| Demineralized water, q.s. ad_____parts by vol__ | 100.000 |

Example XXIV

*Tablets.*—The tablet composition is compounded from the following ingredients:

|  | Parts |
|---|---|
| 1-dimethylaminoethyl-2-(α-pyridyl) - 4 - oxo - 1,2,3,4-tetrahydro-quinazoline hydrochloride | 30 |
| Talcum | 50 |
| Corn starch | 76 |
| Lactose | 90 |
| Stearic acid | 1 |
| Gelatin | 3 |
| Total | 250 |

Tablet weight: 250 mgm.

Example XXV

*Coated pills.*—The tablets of Example XXVIII are coated with a coating which is compounded from the following ingredients:

|  | Parts |
|---|---|
| Titanium dioxide | 2 |
| Gum arabic | 6 |
| Waxes | 2 |
| Talcum | 70 |
| Sugar | 70 |
| Total | 150 |

Weight of each coated tablet: 400 mgm.

Although the dosage unit composition examples given above illustrate only one compound of the invention as an active ingredient, it should be understood that any of the other compounds embraced by Formula I or their non-toxic acid addition salts or non-toxic quaternary ammonium salts may be substituted as active ingredients in Examples XXII to XXIX. Moreover, it should be understood that the quantities of the active ingredient in the illustrative dosage unit compositions may be varied within the limits of the dosage unit range indicated above to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention or the scope of the appended claims.

We claim:

1. A compound selected from the group consisting of 4-oxo-1,2,3,4-tetrahydro-quinazolines of the formula

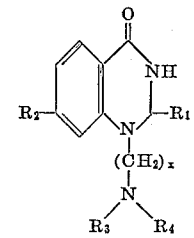

wherein $R_1$ is selected from the group consisting of phenyl, chlorophenyl, methylphenyl, methoxy-phenyl, benzyl and pyridyl, $R_2$ is selected from the group consisting of hydrogen and chlorine, $R_3$ and $R_4$ are each selected from the group consisting of methyl and ethyl, and $x$ is an integer from 2 to 3, inclusive, and their non-toxic, pharmacologically acceptable acid addition salts.

2. 1-dimethylaminoethyl-2-(α-pyridyl)-4-oxo - 1,2,3,4-tetrahydro-quinazoline.

3. 1 - dimethylaminoethyl-2-(γ-pyridyl)-4-oxo-1,2,3,4-oxo-1,2,3,4-tetrahydroquinazoline.

4. 1 - dimethylaminoethyl-2-(p - chlorophenyl)-4-oxo-1,2,3,4-tetrahydro-quinazoline.

5. 1 - dimethylaminoethyl-2-phenyl-4-oxo-1,2,3,4-tetrahydro-quinazoline.

References Cited by the Examiner
UNITED STATES PATENTS

| 2,585,935 | 2/52 | Hepworth et al. | 260—256.4 |
| 2,707,696 | 5/55 | Worne | 167—65 |
| 2,944,056 | 7/60 | Marakashi et al. | 260—256.4 |
| 3,096,241 | 7/63 | Hays | 167—65 |

NICHOLAS S. RIZZO, *Primary Examiner.*

UNITED STATES PATENT OFFICE
CERTIFICATE OF CORRECTION

Patent No. 3,215,697                      November 2, 1965

Karl Heinz Hauptmann et al.

It is hereby certified that error appears in the above numbered patent requiring correction and that the said Letters Patent should read as corrected below.

Column 1, lines 48 to 56, formula (II) should appear as shown below instead of as in the patent:

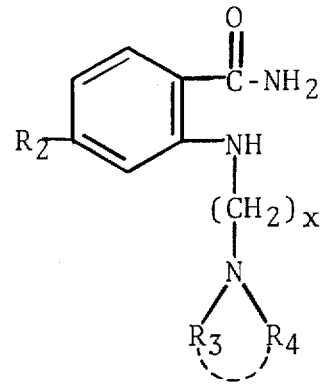

column 2, lines 40 to 50, formula (VI) should appear as shown below instead of as in the patent:

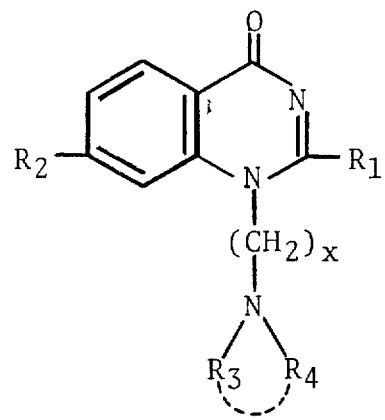

3,215,697 same column 2, line 56, for "acide" read -- acid --; column 9, line 45, for "p-picolinaldehpde" read -- m-picolinaldehyde --; line 62, for "furamric" read -- fumaric --; column 10, line 12, for "compound" read -- compounded --.

Signed and sealed this 9th day of August 1966.

(SEAL)
Attest:

ERNEST W. SWIDER
Attesting Officer

EDWARD J. BRENNER
Commissioner of Patents